US012683176B2

(12) United States Patent
Kattan et al.

(10) Patent No.: US 12,683,176 B2
(45) Date of Patent: Jul. 14, 2026

(54) OXYGEN ELECTRODE CATALYTIC LAYER FOR REVERSIBLE, ALKALINE OR ANION EXCHANGE MEMBRANE ELECTROCHEMICAL DEVICES

(71) Applicant: HYDROLITE LTD, Caesarea (IL)

(72) Inventors: Mordechai Kattan, Harish (IL); Aviv Ashdot, Atlit (IL); Ortal Tiurin Burshtein, Pardes Hannah (IL); Charly David Azra, Harish (IL); Ervin Tal-Gutelmacher, Hod Hasharon (IL)

(73) Assignee: HYDROLITE LTD, Caesarea (IL)

( * ) Notice: Subject to any disclaimer, the term of this patent is extended or adjusted under 35 U.S.C. 154(b) by 46 days.

(21) Appl. No.: 18/543,001

(22) Filed: Dec. 18, 2023

(65) Prior Publication Data

US 2024/0120518 A1     Apr. 11, 2024

Related U.S. Application Data

(63) Continuation-in-part of application No. 18/502,802, filed on Nov. 6, 2023, and a continuation-in-part of
(Continued)

(30) Foreign Application Priority Data

Nov. 6, 2022     (IL) ......................................... 297987

(51) Int. Cl.
H01M 8/0656     (2016.01)
H01M 4/88     (2006.01)
(Continued)

(52) U.S. Cl.
CPC ....... H01M 8/0656 (2013.01); H01M 4/8807 (2013.01); H01M 8/04291 (2013.01); H01M 8/249 (2013.01)

(58) Field of Classification Search
CPC ............. H01M 8/0656; H01M 4/8804; H01M 8/04291; H01M 8/249
See application file for complete search history.

(56) References Cited

U.S. PATENT DOCUMENTS 3,733,221 A     5/1973 Sandle et al.
6,149,810 A * 11/2000 Gonzalez-Martin .... C25B 13/02
204/252
(Continued)

FOREIGN PATENT DOCUMENTS

CN     108110284     6/2018
CN     113130916     7/2021
(Continued)

OTHER PUBLICATIONS

Ashdot A. et al. Design Strategies for Alkaline Exchange Membrane-Electrode Assemblies : Optimization for Fuel Cells and Electrolyzers. Membranes, vol. 11, Issue 9, 2021, Article 686, pp. 1-18, https://doi.org/10.3390/membranes11090686 Sep. 3, 2021 (Sep. 3, 2021).
(Continued)

*Primary Examiner* — Olatunji A Godo
(74) *Attorney, Agent, or Firm* — PEARL COHEN ZEDEK LATZER BARATZ LLP

(57) ABSTRACT

Oxygen electrodes, production methods and reversible, alkaline or anion exchange membrane (AEM) electrochemical devices are provided. The oxygen electrodes are operable in the reversible devices both as cathodes of a fuel cell supporting an oxygen reduction reaction (ORR), and as anodes of an electrolyzer supporting an oxygen evolution reaction (OER). The oxygen electrodes comprise a substrate layer which may be a porous transport layer (PTL), possibly coated and/or hydrophobized, or a membrane; and a blend of catalysts which is deposited on the substrate layer to form a catalyst layer, and includes ORR catalyst (e.g., a platinum
(Continued)

group metal), OER catalyst (e.g., nickel-based particles), and possibly binders such as ionomers, PTFE or other polymers that are resistant in alkaline environment, but with the catalyst layer and the substrate layer being devoid of elemental carbon.

21 Claims, 8 Drawing Sheets

Related U.S. Application Data application No. 18/244,344, filed on Sep. 11, 2023, which is a continuation of application No. 18/075, 490, filed on Dec. 6, 2022, now Pat. No. 11,888,196, which is a continuation-in-part of application No. 17/830,424, filed on Jun. 2, 2022, now abandoned, application No. 18/543,001 is a continuation-in-part of application No. PCT/IL2022/050590, filed on Jun. 2, 2022.

(60) Provisional application No. 63/221,035, filed on Jul. 13, 2021, provisional application No. 63/211,186, filed on Jun. 16, 2021.

(51) Int. Cl.
  H01M 8/04291    (2016.01)
  H01M 8/249      (2016.01)

(56) References Cited

U.S. PATENT DOCUMENTS

| | | | |
|---|---|---|---|
| 6,524,736 | B1 | 2/2003 | Sompalli et al. |
| 2002/0055034 | A1 | 5/2002 | Fukuda et al. |
| 2007/0298302 | A1 | 12/2007 | Oschmann |
| 2010/0101955 | A1* | 4/2010 | Nocera ................. C25B 11/073 |
| | | | 204/547 |
| 2010/0323249 | A1 | 12/2010 | Fujiwara et al. |
| 2011/0262828 | A1 | 10/2011 | Noda et al. |
| 2013/0146471 | A1 | 6/2013 | Dubois et al. |
| 2015/0349368 | A1* | 12/2015 | Arges ........................ C25B 9/23 |
| | | | 204/266 |
| 2018/0075490 | A1 | 3/2018 | Chintalapoodi et al. |
| 2019/0229344 | A1* | 7/2019 | Rezvani .............. H01M 4/8657 |
| 2020/0407861 | A1* | 12/2020 | Dai .......................... C25D 9/06 |
| 2021/0028465 | A1 | 1/2021 | Dresp et al. |
| 2021/0066741 | A1 | 3/2021 | Park et al. |
| 2023/0098124 | A1 | 3/2023 | Page et al. |

FOREIGN PATENT DOCUMENTS

| | | |
|---|---|---|
| CN | 113549956 | 10/2021 |
| CN | 114759197 | 7/2022 |
| WO | WO 2012/044273 | 4/2012 |
| WO | WO 2022/157777 | 7/2022 |

OTHER PUBLICATIONS

Cho M. K. et al. Factors in electrode fabrication for performance enhancement of anion exchange membrane water electrolysis. Journal of Power Sources, vol. 347, 2017, pp. 283-290, ISSN 0378-7753, https://doi.org/10.1016/j.jpowsour.2017.02.058. Feb. 28, 2017 (Feb. 28, 2017).

Dekel D.R. Review of cell performance in anion exchange membrane fuel cells. Journal of Power Sources, vol. 375, 2018, pp. 158-169, Online ISSN 1873-2755, <https://doi.org/10.1016/j.jpowsour. 2017.07. 117>, Available Online Aug. 4, 2017.

Park J. E. et al. High-performance anion-exchange membrane water electrolysis. Electrochimica Acta, vol. 295, 2019, pp. 99-106, ISSN 0013-4686, <https://doi.org/10.1016/j.electacta.2018.10.143>. Oct. 23, 2018 (Oct. 23, 2018).

* cited by examiner

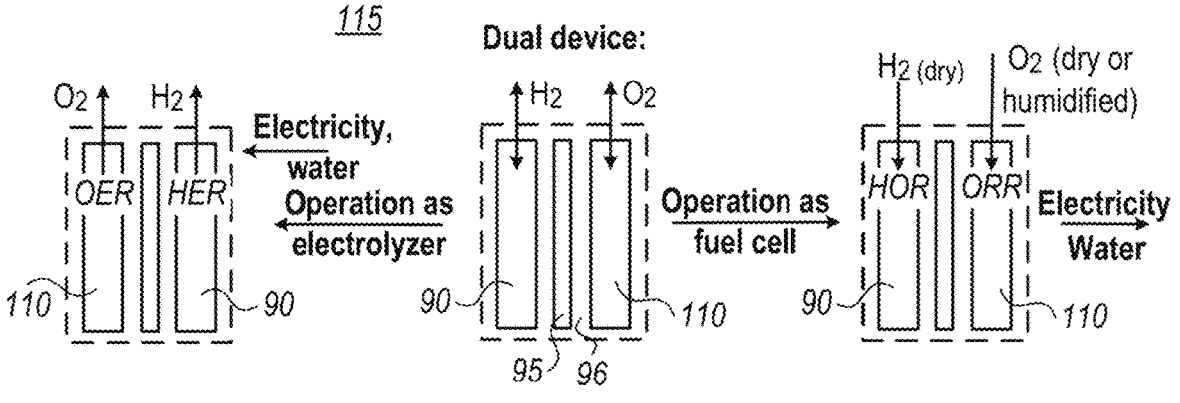
*Figure 1A*
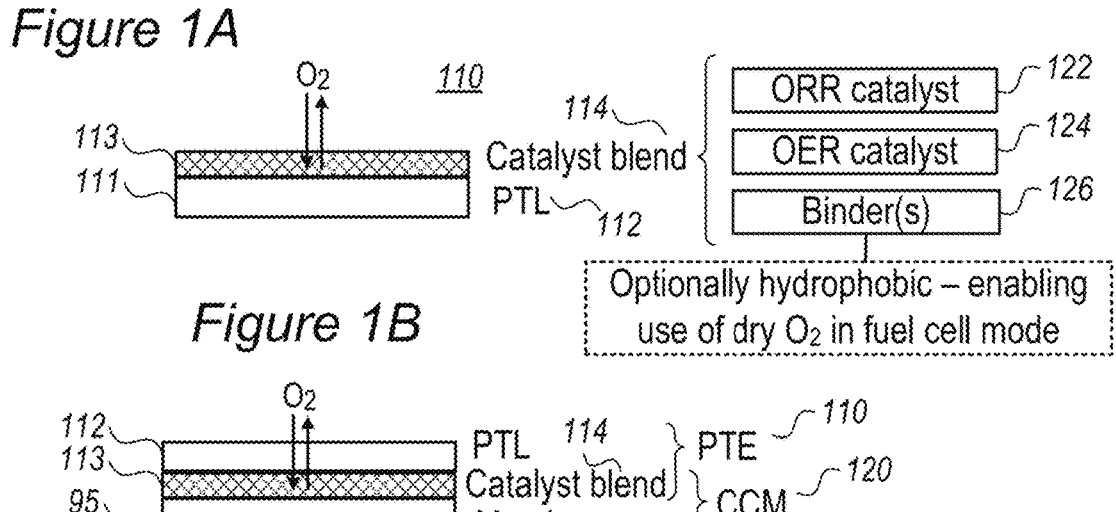
*Figure 1B*
*Figure 1C*
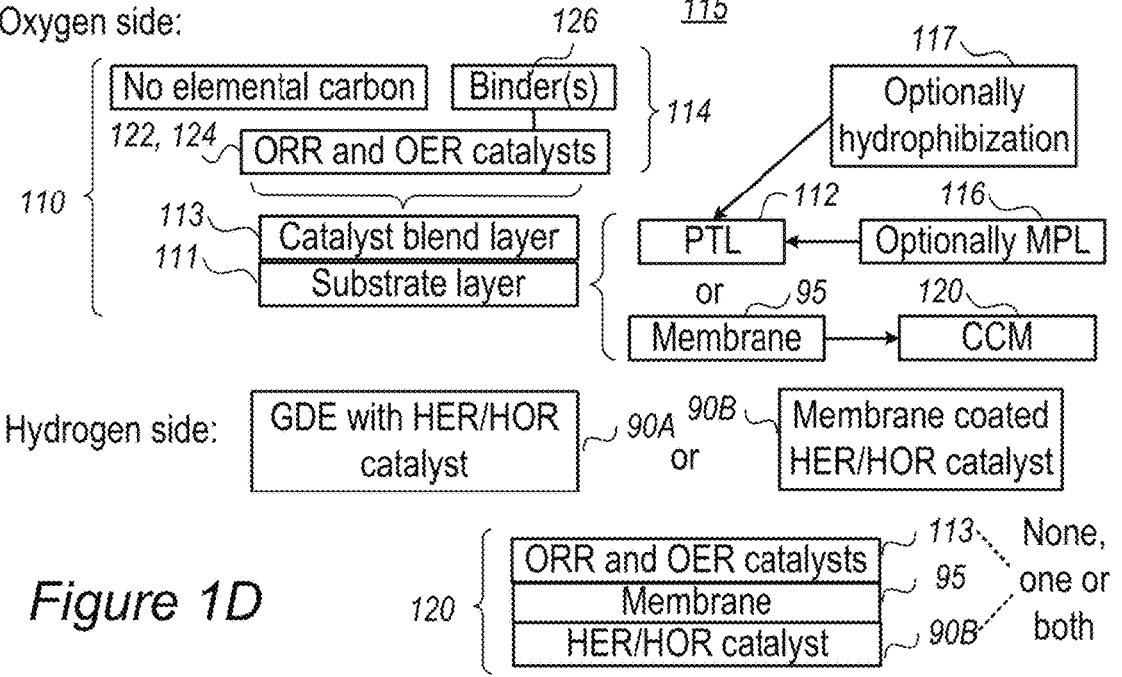
*Figure 1D*

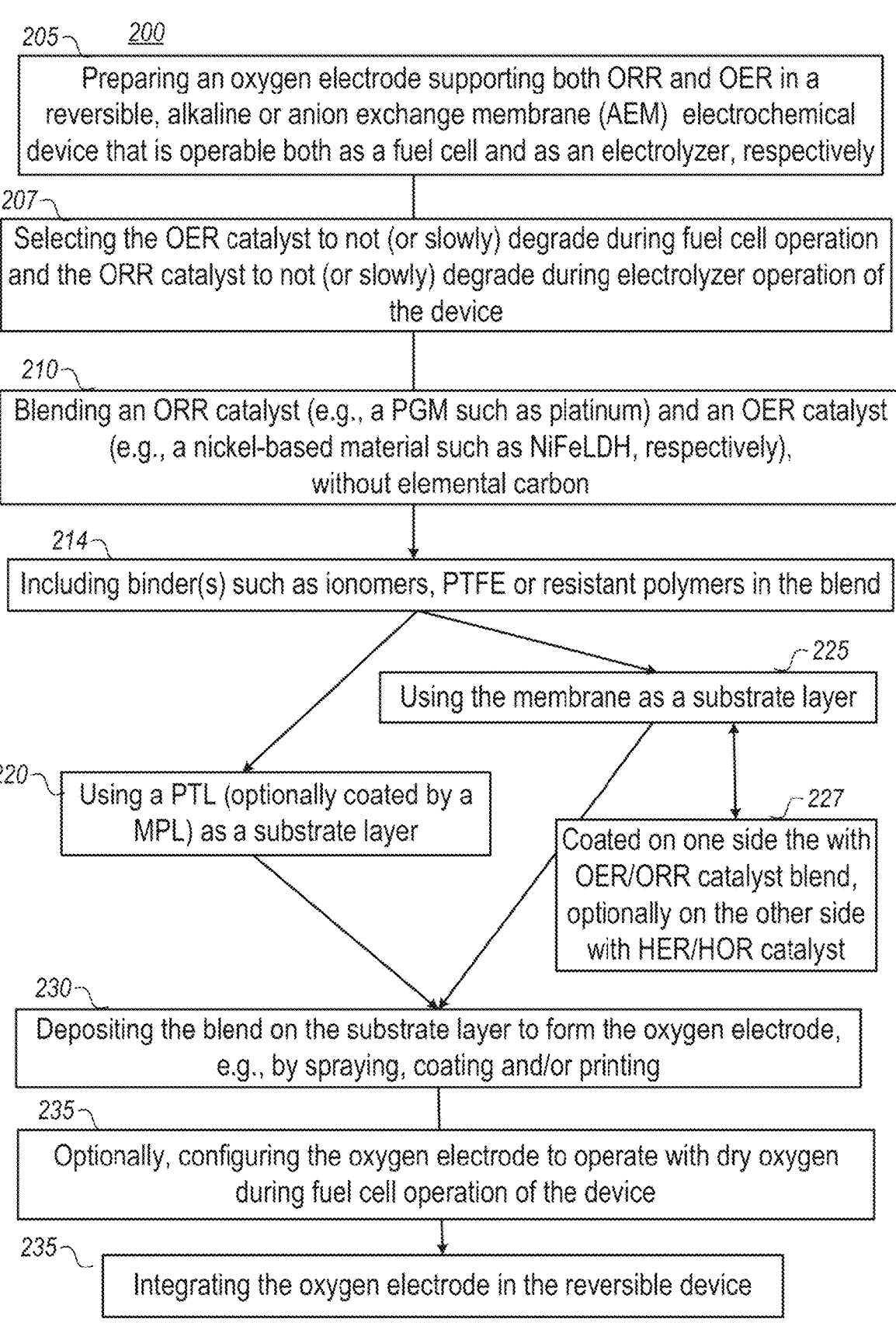

205 ⌐     _200_

Preparing an oxygen electrode supporting both ORR and OER in a reversible, alkaline or anion exchange membrane (AEM) electrochemical device that is operable both as a fuel cell and as an electrolyzer, respectively

207 ⌐

Selecting the OER catalyst to not (or slowly) degrade during fuel cell operation and the ORR catalyst to not (or slowly) degrade during electrolyzer operation of the device

210 ⌐

Blending an ORR catalyst (e.g., a PGM such as platinum) and an OER catalyst (e.g., a nickel-based material such as NiFeLDH, respectively), without elemental carbon

214 ⌐

Including binder(s) such as ionomers, PTFE or resistant polymers in the blend

225

Using the membrane as a substrate layer

220 ⌐

Using a PTL (optionally coated by a MPL) as a substrate layer

227

Coated on one side the with OER/ORR catalyst blend, optionally on the other side with HER/HOR catalyst

230 ⌐

Depositing the blend on the substrate layer to form the oxygen electrode, e.g., by spraying, coating and/or printing

235 ⌐

Optionally, configuring the oxygen electrode to operate with dry oxygen during fuel cell operation of the device

235 ⌐

Integrating the oxygen electrode in the reversible device

*Figure 2*

*110*                    *PTL fibers coated with catalyst blend*

I (mA/cm²)

OXYGEN ELECTRODE CATALYTIC LAYER FOR REVERSIBLE, ALKALINE OR ANION EXCHANGE MEMBRANE ELECTROCHEMICAL DEVICES

CROSS REFERENCE TO RELATED APPLICATIONS

This application is a Continuation-in-Part of U.S. patent application Ser. No. 18/244,344 filed on Sep. 11, 2023, which is a Continuation of U.S. patent application Ser. No. 18/075,490, filed Dec. 6, 2022, which a Continuation-in-Part of U.S. patent application Ser. No. 17/830,424, filed Jun. 2, 2022, which claims the benefit of U.S. Provisional Application No. 63/211,186, filed on Jun. 16, 2021, and U.S. Provisional Application No. 63/221,035, filed on Jul. 13, 2021; this application is also a Continuation-in-Part of International Application No. PCT/IL2022/050590, filed on Jun. 2, 2022. The prior applications are incorporated herein by reference in their entirety.

This application is a Continuation-in-Part of U.S. patent application Ser. No. 18/502,802 filed on Nov. 6, 2023, which claims priority from Israeli Patent Application No. 297987, filed on Nov. 6, 2022, both applications being incorporated herein by reference in their entirety.

BACKGROUND OF THE INVENTION

1. Technical Field

The present invention relates to the field of reversible electrochemical devices, and more particularly, to oxygen electrodes therefor.

2. Discussion of Related Art

Intensive research is conducted in the field of electrochemical devices towards developing and improving fuel cells and electrolyzers. A crucial component in these is the oxygen electrode, which catalyzes oxygen reduction and oxygen generation, respectively, in these devices.

For example, U.S. Patent Application Publication No. 20210028465, which is incorporated herein by reference in its entirety, discloses Catalyst material for a fuel cell or an electrolyser, which comprises a doped manganese oxide, a NiFe intercalation compound and a conductive carrier material, wherein the doped manganese oxide and the NiFe intercalation compound are supported on the conductive carbon-containing carrier material.

SUMMARY OF THE INVENTION

The following is a simplified summary providing an initial understanding of the invention. The summary does not necessarily identify key elements nor limit the scope of the invention, but merely serves as an introduction to the following description.

One aspect of the present invention provides an oxygen electrode for a reversible, alkaline or anion exchange membrane (AEM) electrochemical device that is operable both as a fuel cell with the oxygen electrode supporting an oxygen reduction reaction (ORR) as a cathode of the fuel cell, and as an electrolyzer with the oxygen electrode supporting an oxygen evolution reaction (OER) as an anode of the electrolyzer, the oxygen electrode comprising a substrate layer that is devoid of elemental carbon, and a catalyst layer comprising a blend of an ORR catalyst comprising at least one platinum group metal (PGM) and an OER catalyst comprising at least nickel-based particles, the catalyst layer being devoid of elemental carbon and deposited on the substrate layer.

One aspect of the present invention provides a dual, reversible, alkaline or anion exchange membrane (AEM) electrochemical device that is operable both as a fuel cell and as an electrolyzer, with the device comprising disclosed oxygen electrodes and an electrode supporting a hydrogen oxidation reaction (HOR) when the device is operated as the fuel cell, and hydrogen evolution reaction (HER) when the device is operated as the electrolyzer.

One aspect of the present invention provides a method of preparing an oxygen electrode for a reversible, alkaline or anion exchange membrane (AEM) electrochemical device that is operable both as a fuel cell with the oxygen electrode supporting an oxygen reduction reaction (ORR) as a cathode of the fuel cell, and as an electrolyzer with the oxygen electrode supporting an oxygen evolution reaction (OER) as an anode of the electrolyzer, the method comprising blending an ORR catalyst comprising at least one platinum group metal (PGM) and an OER catalyst comprising at least nickel-based particles, the blend being devoid of elemental carbon, and depositing the blend on a substrate layer to form the oxygen electrode.

These, additional, and/or other aspects and/or advantages of the present invention are set forth in the detailed description which follows, possibly inferable from the detailed description, and/or learnable by practice of the present invention.

BRIEF DESCRIPTION OF THE DRAWINGS

For a better understanding of embodiments of the invention and to show how the same may be carried into effect, reference will now be made, purely by way of example, to the accompanying drawings in which like numerals designate corresponding elements or sections throughout. In the accompanying drawings:

FIGS. 1A-1D are high-level schematic illustrations of oxygen electrodes in reversible, alkaline or anion exchange membrane (AEM) electrochemical devices, according to some embodiments of the invention.

FIG. 2 is a high-level flowchart illustrating a method, according to some embodiments of the invention.

Figure 3:
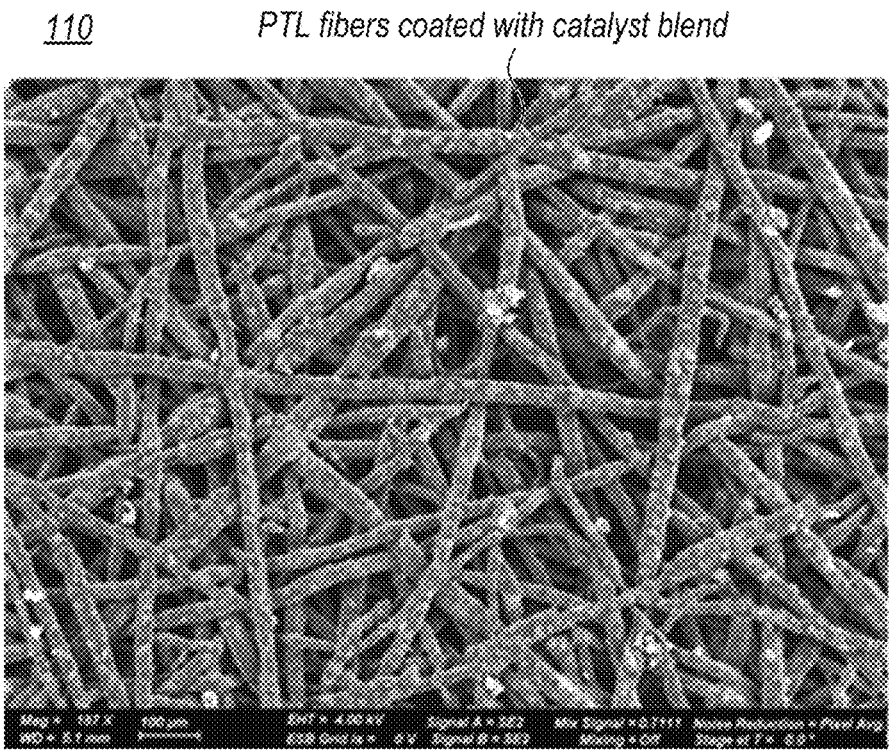
FIG. 3 is a SEM (scanning electron microscopy) image of an oxygen electrode indicating PTL fibers coated by catalyst blend, according to some embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following description, various aspects of the present invention are described. For purposes of explanation, specific configurations and details are set forth in order to provide a thorough understanding of the present invention. However, it will also be apparent to one skilled in the art that the present invention may be practiced without the specific details presented herein. Furthermore, well known features may have been omitted or simplified in order not to obscure the present invention. With specific reference to the drawings, it is stressed that the particulars shown are by way of example and for purposes of illustrative discussion of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Before at least one embodiment of the invention is explained in detail, it is to be understood that the invention is not limited in its application to the details of construction and the arrangement of the components set forth in the following description or illustrated in the drawings. The invention is applicable to other embodiments that may be practiced or carried out in various ways as well as to combinations of the disclosed embodiments. Also, it is to be understood that the phraseology and terminology employed herein are for the purpose of description and should not be regarded as limiting.

Some embodiments of the present invention provide efficient and economical methods and mechanisms for configuring oxygen electrodes and thereby provide improvements to the technological field of reversible, alkaline or anion exchange membrane (AEM) electrochemical devices. Oxygen electrodes, production methods and reversible, alkaline or AEM electrochemical devices are provided. The oxygen electrodes are operable in the reversible devices both as cathodes of a fuel cell supporting an oxygen reduction reaction (ORR), and as anodes of an electrolyzer supporting an oxygen evolution reaction (OER). The oxygen electrodes comprise a substrate layer which may be a porous transport layer (PTL), possibly coated and/or hydrophobized, or a membrane; and a blend of catalysts which is deposited on the substrate layer to form a catalyst layer, and including ORR catalyst (e.g., a platinum group metal), OER catalyst (e.g., nickel-based particles), and possibly binders such as ionomers, PTFE or other polymers resistant in alkaline environment, but with the catalyst layer and the substrate layer being devoid of elemental carbon. It is noted that while carbon is an essential component of prior art fuel cell layers which provides conductivity and gas transport properties, disclosed catalyst layers are designed to work without elemental carbon (contrary, e.g., to prior art such as U.S. Patent Application Publication No. 20210028465 that was referred to above)—to avoid corrosion at voltages larger than 1V during operation of the reversible device as an electrolyzer. It is noted that being devoid of elemental carbon, disclosed catalyst layers and electrodes do not include elemental carbon in form of pure carbon which is not combined with other elements. However, disclosed catalyst layers and electrodes may comprise carbon as a structural polymer backbone, combined with other elements such as H, O, F, etc., e.g., in various polymer binders.

FIGS. 1A-1D are high-level schematic illustrations of oxygen electrodes 110 in reversible, alkaline or an anion exchange membrane (AEM) electrochemical devices 115, according to some embodiments of the invention. FIG. 1A schematically illustrates dual, reversible, alkaline or AEM electrochemical devices 115 which are operable both as a fuel cell (receiving hydrogen and oxygen to generate electrical power, and water as byproduct) with oxygen electrode 110 supporting an oxygen reduction reaction (ORR), and as an electrolyzer (receiving water to generate hydrogen and oxygen, using supplied electrical power) with oxygen electrode 110 supporting an oxygen evolution reaction (OER). ORR and OER are carried out using corresponding catalysts that promote and control the respective reactions. In various embodiments, the OER catalyst is selected to not degrade, or to degrade slowly, during fuel cell operation of device 115, and the ORR catalyst is selected to not degrade, or to degrade slowly, during electrolyzer operation of the device—to provide a predefined number of cycles for devices 115, e.g., several hundreds of cycles, several thousands of cycles, or more. Oxygen used for fuel cell operation may be humidified or dry. Hydrogen used for fuel cell operation may be humidified or dry. In various embodiments, either hydrogen and/or oxygen may be used in dry or humidified state, depending on the operation conditions and device configurations.

Devices 115 are operable with a hydrogen electrode 90 supporting a hydrogen oxidation reaction (HOR) when device 115 is operated as the fuel cell, and hydrogen evolution reaction (HER) when device 115 is operated as the electrolyzer. Hydrogen electrode 90 may comprise, e.g., a gas diffusion electrode (GDE) 90A (see FIG. 1D) comprising a catalyst-coated GDL (gas diffusion layer) or a catalyst-coated CCM (with HER/HOR catalyst coated on the opposite side of the membrane—denoted 90B in FIG. 1D—with respect to the coated OER/ORR catalyst). A membrane 95 (e.g., polymeric, as separator and/or ionomeric) and/or alkaline electrolyte 96 (e.g., KOH, with or without membrane 95, possibly with porous membrane 95 allowing flow-through of the electrolyte) separate electrodes 90, 110, with membrane 95 possibly configured as an anion exchange membrane, or optionally as separator. It is noted that the oxygen and hydrogen electrodes include respective GDLs and corresponding catalyst layers (OER/ORR catalysts and HER/HOR catalyst respectively)—which may however be coated on either the respective GDL or on the respective side of membrane 95 which separates the electrodes.

Devices 115 may be further configured to receive hydrogen (e.g., from a hydrogen unit, possibly compressed), oxygen (e.g., from an oxygen unit, possibly compressed), water, dilute electrolyte and/or additional electrolyte from respective reservoirs, and have power connection(s) to receive and deliver power during electrolyzer and fuel cell operation, respectively. Various further details concerning configuration embodiments of devices 115 are disclosed in U.S. Patent Application Publication No. 20230098124, which is incorporated herein by reference in its entirety.

FIG. 1B schematically illustrates oxygen electrodes 110, which comprise a substrate layer 111 (e.g., either a porous transport layer PTL 112 or a membrane 105), and a blend of catalysts 114 deposited thereupon to form a catalyst layer 113. Catalyst layer 113 may comprise an ORR catalyst 122 comprising at least one platinum group metal (PGM), an OER catalyst 124 comprising at least nickel-based particles, such as nickel nanoparticles, Raney nickel, NiFeLDH (layered double hydroxide), Ni oxides, Ni hydroxides and additional examples for nickel and nickel-based compounds such as $NiFe_2O_4$, Ni—Mo catalysts, Ni—Co catalysts or Ni—Mo—Co catalysts, or other nickel-based compounds; and binder(s) 126. Catalyst blend 114 and catalyst layer 113 are devoid of elemental carbon or any other support, providing the advantage of more robust electrolyzer operation due to avoidance of carbon electro-corrosion at voltages above 1 V during electrolyzer operation. Catalyst layer 113 may be applied to substrate layer 111 in a way that ensures sufficient catalyst activity with respect to particle structure and catalyst loading.

In certain embodiments, oxygen electrode 110 and electrochemical devices 115 may be configured to operate on dry oxygen during fuel cell operation of the device (e.g., with hydrophobized substrate layer for the catalyst blend). Specifically, hydrophobic binder(s) 126 such as PTFE may be used to form hydrophobic catalyst layer 113 that enables operation with dry oxygen in fuel cell mode. In various embodiments, hydrophobic catalyst layer 113 may be configured to operate with humidified oxygen. Alternatively, catalyst layer 113 may be configured to be non-hydrophobic and operate with humidified oxygen, e.g., with high throughputs.

In various embodiments, the relative humidity (RH) may range between 0%-100%, or any subrange or intermediate value thereof. In particular, disclosed embodiments of catalyst layer 113 and its being devoid of elemental carbon enable operation of devices 115 in electrolyzer mode with dry oxygen, having 0-20% RH, 0-10% RH, <5% RH, <1% RH or even 0 RH, with hydrophobic binder(s) 126.

Catalyst blend 114 may further comprise one or more binder(s) 126 such as ionomer material(s), hydrophobic polymers (e.g., PTFE) and/or inert binder polymers that are resistant to alkaline environment. Non-limiting examples for ionomers include continuous anion conducting ionomer (for AEM implementations) comprising, e.g., polymers or copolymers of (vinylbenzyl)trimethylammonium chloride, wherein the chloride counterion may be exchanged to any desired anion, copolymers of diallyldimethylammonium chloride (DADMAC), wherein the counterion may be exchanged to any desired anion, styrene-based polymers having quaternary ammonium anion conducting group, quaternized poly(vinylalcohol) (QPVA), bi-phenyl (BP) or tri-phenyl (TP) backboned polymers with one or more functional groups that could include alkyl tether group(s) and/or alkyl halide group(s) and/or equivalent groups, poly (arylpiperidinium) (PAP) and other polymers containing cyclic quaternary ammonium in the backbone or on tethered sidechains, poly(bis-arylimidazoliums), cation-functionalized poly(norbornenes), neutral polymers or polymer membranes with grafted anion-conductive sidechains, or any other anion-conducting polymer. In some embodiments, the anion conducting ionomer may be crosslinked, e.g., using crosslinking agent(s) selected according to the type of the ionomer to be crosslinked, such as divinylbenzne, N,N,N', N'-tetramethyl-1,6-hexanediamine (TMHDA), 1,4-diazabicyclo[2.2.2]octane (DABCO), glyoxal, glutaraldehyde, styrene based polymer(s) having quaternary ammonium anion conducting group(s), bi-phenyl or tri-phenyl backboned with one or more functional groups that could include alkene tether group(s) and/or alkyl halide group(s) and/or equivalent groups, hydrocarbon chains, sulfur groups, siloxy groups, N-hydroxybenzotriazole groups, azide groups and the like. In some embodiments, the anion conducting ionomer may be a blend of several polymers, some of which may not be anion conducting.

FIG. 1C schematically illustrates oxygen electrodes 110 that are part of a catalyst coated membrane (CCM) 120, with catalyst blend 114 being deposited or attached as catalyst layer 113 to one side of membrane 95 to form CCM 120, so that CCM 120 is coated on one side by blend 114 of ORR catalyst 122 and OER catalyst 124. Catalyst layer 113 contacts PTL 112 on the other side of deposited catalyst layer 113. In CCM configurations, membrane 95 may be coated on one side only (by catalyst blend 114 forming catalyst layer 113 and/or with HER/HRR catalyst on the other side of membrane 95). Alternatively, oxygen electrodes 110 may be configured as PTE (porous transport electrode) on PTL 112 as substrate, with membrane 95 adjacent to catalyst layer 113. In either case, CCM 120 or PTE 110 may be hydrophobic (e.g., with hydrophobic binder such as PTFE as part of catalyst layer 113), may operate with dry oxygen or with humidified oxygen in fuel cell mode; or CCM 120 or PTE 110 may be non-hydrophobic, operating with humidified oxygen, e.g., at high throughputs.

FIG. 1D summarizes schematically various embodiments and disclosed configurations of oxygen electrodes 110, including as substrate layer 111, e.g., PTL 112 or membrane 95. PTL 112 may be made of nickel, stainless steel, titanium, alloys thereof and/or combinations thereof. PTL 112 may optionally be coated by a microporous layer (MPL) 116, e.g., made of a similar metal as PTL 112, attached thereto and having a predefined pore size distribution). Alternatively or complementarily, PTL 112 may be hydrophobized 117, e.g., by treatment with polytetrafluoroethylene (PTFE) or with alkylsilanes to avoid flooding events. For example, hydrophobized PTL may enable or improve operation with dry oxygen (and/or hydrogen in the device), even at low flow rates. Hydrophobized PTL may also improve performance with humidified oxygen (and/or humidified hydrogen). Membrane 95 may be configured to form CCM 120 when coated on one or both of its sides, with the membrane providing substrate layer 111.

Catalyst layer 113 that is coated over substrate layer 111 comprises catalyst blend 114 of ORR and OER catalysts 122, 124, respectively, and binder(s) 126 such as ionomer materials(s), PTFE or alkylsilanes and/or other polymer material(s) that are resistant to alkaline environment. In any of the embodiments, catalyst layer 113 and catalyst blend 114 are devoid of elemental carbon. Oxygen electrode 110 with catalyst layer 113 may be hot-pressed briefly (e.g., a few minutes, e.g. between ten seconds to ten minutes, at around the glass temperature of the binder, e.g., within the temperature range of 80-180° C., or between 110° C. and 140° C.) to enhance its stability, homogeneity and increase its operational durability.

FIG. 2 is a high-level flowchart illustrating a method 200, according to some embodiments of the invention. The method stages may be carried out with respect to oxygen electrodes 110 and reversible, alkaline or anion exchange membrane (AEM) electrochemical devices 115 described herein. Method 200 comprises preparing an oxygen electrode for a reversible, alkaline or AEM electrochemical device that is operable both as a fuel cell with the oxygen electrode as a cathode supporting an oxygen reduction reaction (ORR), and as an electrolyzer with the oxygen electrode as an anode supporting an oxygen evolution reaction (OER) (stage 205), and may comprise the following stages, irrespective of their order. Method 200 may comprise selecting the OER catalyst to not degrade, or to degrade slowly, during fuel cell operation of the device, and the ORR catalyst to not degrade, or to degrade slowly, during electrolyzer operation of the device (stage 207)—to provide a predefined number of cycles for operating the device, e.g., several hundreds of cycles, several thousands of cycles, or more.

Method 200 may comprise blending an ORR catalyst comprising at least one platinum group metal (PGM, e.g., platinum) and an OER catalyst comprising at least a nickel-based particle, e.g., NiFeLDH, the blend being devoid of elemental carbon (stage 210), and depositing the blend on a substrate layer to form the oxygen electrode (stage 230), e.g., by spraying, coating and/or printing. For example, liquid catalyst blend may be applied onto the substrate layer e.g., by any of spraying, electrospray coating, slot die casting, doctor blading, screen printing, inkjet printing, 3D printing, or combinations thereof and/or equivalent methods.

Blending 210 may further comprise including binder(s) in the blend such as ionomer(s), e.g., to provide ion conductivity, hydrophobic polymer(s) such as PTFE to increase hydrophobicity), and/or other polymer(s) which are resistant to the alkaline environment (stage 214).

Non-limiting examples for ionomers for use as binder(s) 126 may include polymer and copolymers of cationic monomers such as (vinylbenzyl)trimethylammonium chloride, alkyl trimethylammonium chloride, diallyldimethylammonium chloride, piperidinium, pyrrolidinium and neutral monomers such as ethylene, butylene, styrene, isoprene, butadiene, phenylene. Functionalization from non-cationic to cationic group after deposition may be carried out e.g., by transforming a non-functional group to a functional group (e.g., transforming chloromethylated group(s) to trimethylammonium group(s). Functionalization may be followed by adding, e.g., trimethylamine (TMA) to initiate quaternization reaction(s).

Non-limiting examples for hydrophobic materials as binder(s) 126 may include polytetrafluoroethylene (PTFE).

Non-limiting examples for neutral materials as binder(s) 126, which are stable in hot alkaline environment may include styrene-ethylene-butylene-stryene (SEBS), styrene-butadiene-styrene (SBS), polystyrene, polyethylene, polypropylene, ethylene-propylene copolymers, cyclic olefin copolymers (COC), and polyvinyl butyral.

The electrode (with the catalyst layer including the binder) may optionally be hot-pressed onto the electrode, e.g., as disclosed in U.S. patent application Ser. No. 18/075, 490 and incorporated herein by reference in its entirety.

In some embodiments, method 200 may comprise using a PTL as the substrate layer (stage 220). The PTL may optionally be coated by a MPL made of a similar metal as the PTL thereto, to provide a predefined pore size distribution to the substrate layer prior to the deposition of the blend thereupon.

In some embodiments, method 200 may comprise using a membrane as the substrate layer (stage 225), forming a one-sided CCM with the oxygen electrode deposited as the catalyst layer on a side of the membrane that is in contact with the PTL, or a two-sided CCM, with the OER/ORR catalyst blend coated on one side of the CCM and HER/HOR catalyst on the other side of the CCM (stage 227).

Method 200 may further comprise configuring the oxygen electrode to operate with dry oxygen during fuel cell operation of the device (stage 235) and/or integrating the oxygen electrode in the reversible device (stage 240).

FIG. 3-8 provide experimental results indicating the efficiency and durability of oxygen electrodes 110 in electrochemical devices 115, according to some embodiments of the invention. FIG. 3 is a SEM (scanning electron microscopy) image of oxygen electrodes 110 indicating PTL fibers coated by catalyst blend 114, according to some embodiments of the invention. Illustrated catalyst layer 113 comprises a loading of 0.696 mg/cm$^2$ of platinum nanoparticles, 0.08 mg/cm$^2$ of NiFeLDH and 0.024 mg/cm2 of a bisphenyl piperidinium ionomer, and device 115 was operated with 0.05M KOH electrolyte 96 and operating temperature of 60° C. In the disclosed non-limiting example, the hydrogen electrode was made of a catalyst layer deposited on a carbon-based GDL. The catalyst layer contained 1.4 mg/cm$^2$ of platinum-ruthenium nanoparticles and 0.19 mg/cm$^2$ of a triphenylpiperidinium ionomer. The device was operated under oxygen in the fuel cell mode and 0.05 M KOH in the electrolyzer mode.

Figure 4:
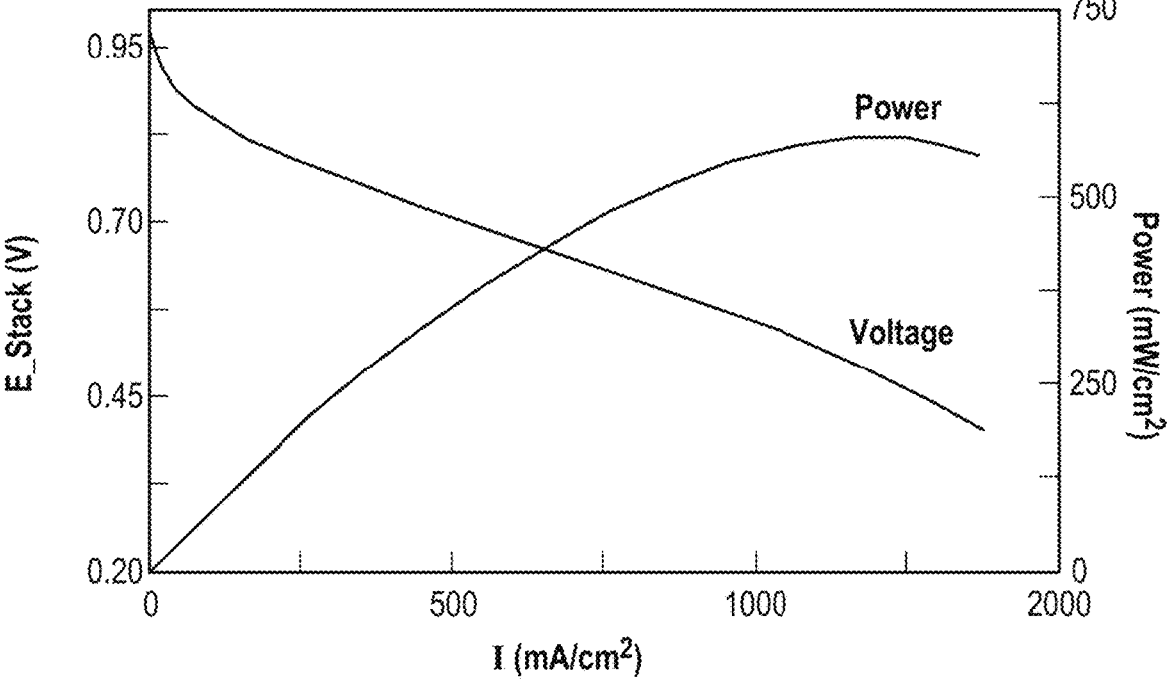
FIG. 4 provides an example for the operation of the device, plotting voltage and power with respect to current, according to some embodiments of the invention.

FIG. 4 provides an example for the operation of the device, plotting voltage and power with respect to current, according to some embodiments of the invention. The results indicate the operability of the device in the disclosed non-limiting example, with the catalyst layer coated on a PTL, with PTFE as binder.

Figure 5A:
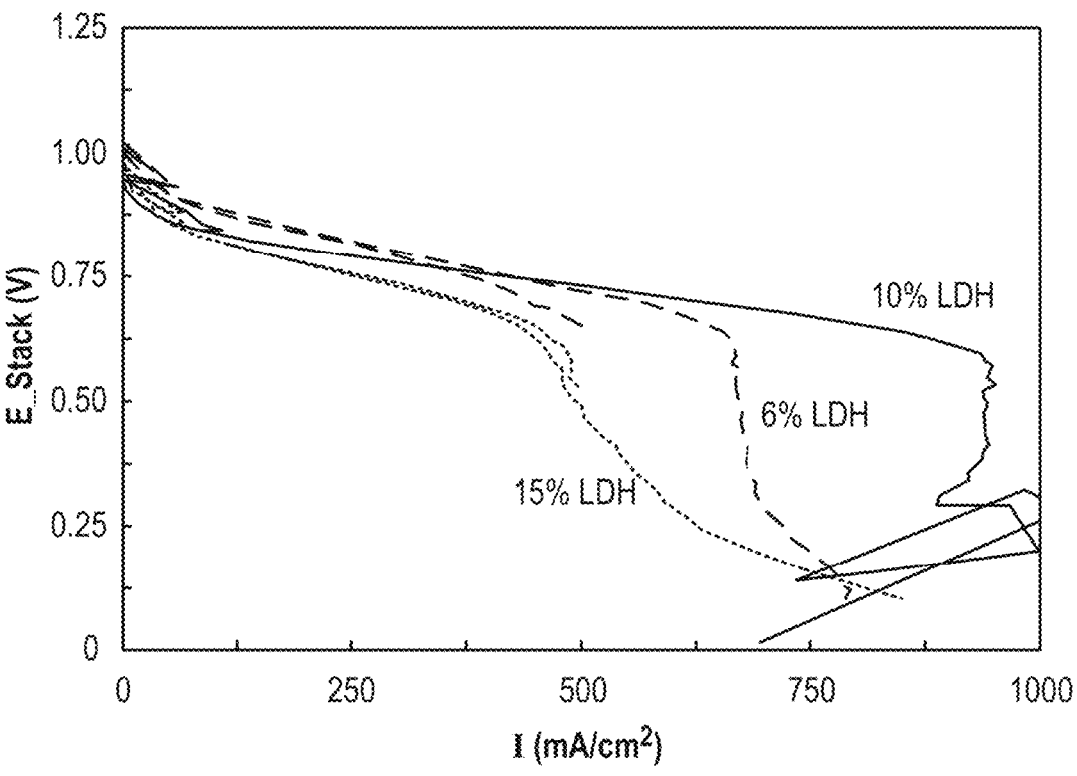
FIGS. 5A and 5B provide experimental results with different amounts of LDH in the catalyst blend, according to some embodiments of the invention.
Figure 5B:
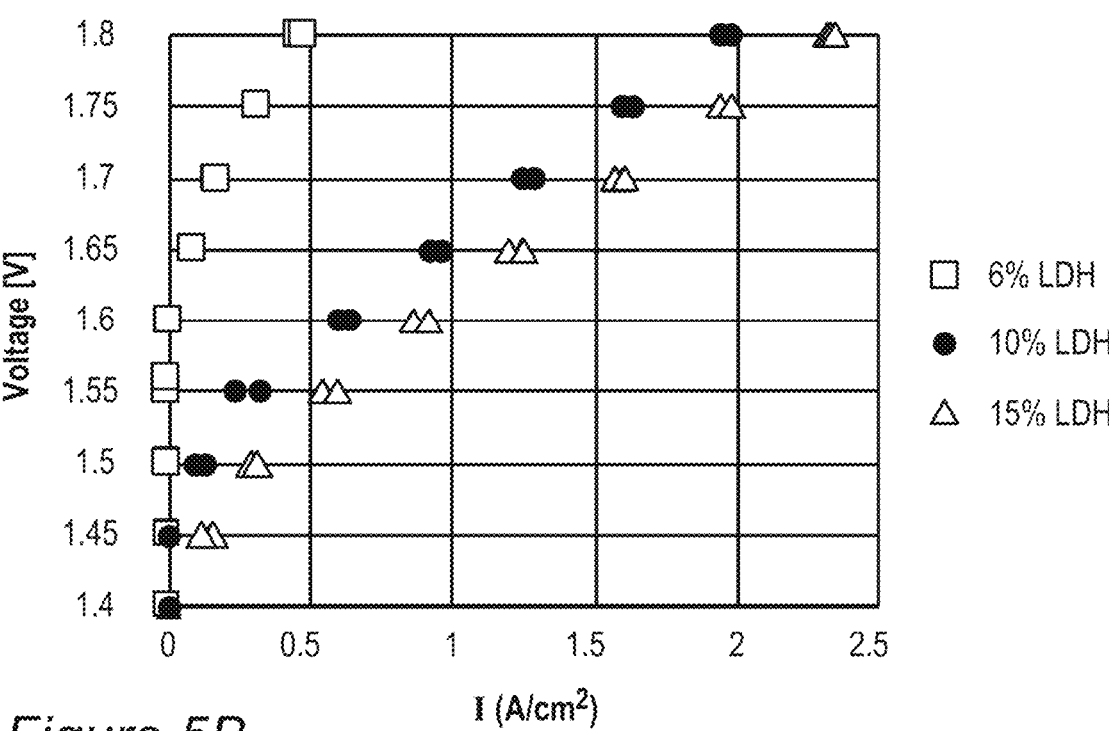

FIGS. 5A and 5B provide experimental results with different amounts of LDH in the catalyst blend, according to some embodiments of the invention. NiFeLDH amounts of 6 wt %, 10 wt % and 15 wt % versus Pt nanoparticles were compared with respect to cell performance as a fuel cell, illustrated in FIG. 5A, and with respect to cell performance as an electrolyzer (with device 115 operated at 60° C. with an electrolyte throughput of 0.5 ml/min of 0.05M KOH) illustrated in FIG. 5B. As indicated in the data, the range of 6-15 wt % NiFe LDH is operable in oxygen electrodes 110. In certain embodiments, larger amounts of NiFe LDH, e.g., up to 40 wt % or intermediate values may be used to prepare operable oxygen electrodes 110. In the experiment, 0.694 mg/cm$^2$ Pt nanoparticles were used with 0.08 mg/cm$^2$ NiFeLDH and 0.024 mg/cm$^2$ ionomer, forming a catalyst loading of 0.8 mg/cm$^2$ with 10% LDH. For 6% LDH 0.728 mg/cm$^2$ Pt nanoparticles were used with 0.048 mg/cm$^2$ NiFeLDH and 0.024 mg/cm$^2$ ionomer, forming a catalyst loading of 0.8 mg/cm$^2$. And for 15% LDH, 0.656 mg/cm$^2$ Pt nanoparticles were used with 0.012 mg/cm$^2$ NiFeLDH and 0.024 mg/cm$^2$ ionomer.

Figure 5C:
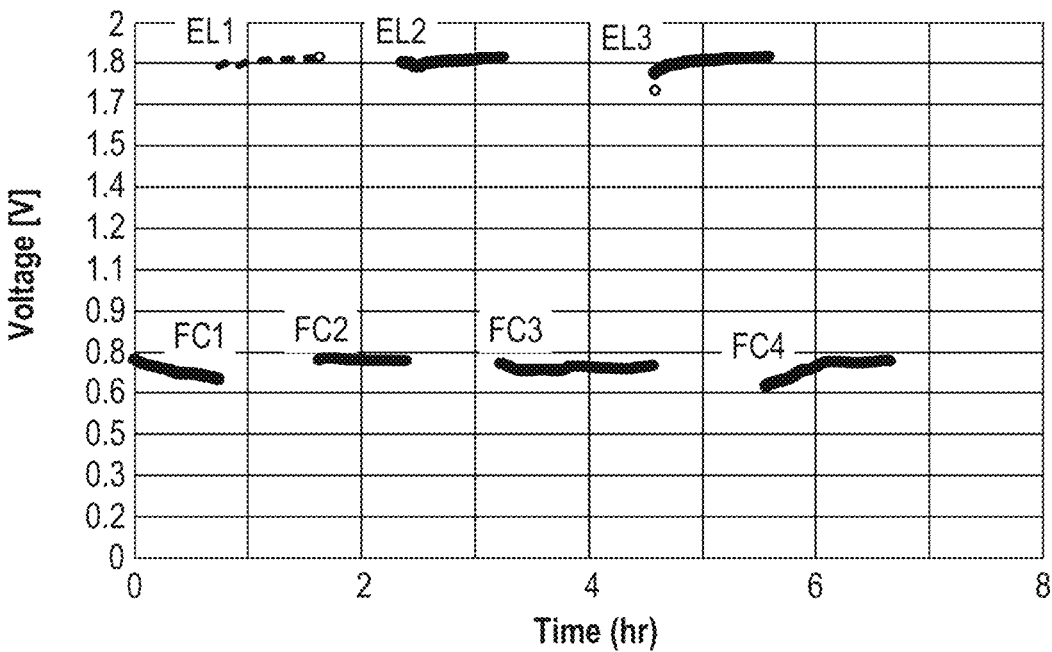
FIGS. 5C and 5D provide experimental results for four cycles between electrolyzer and fuel cell modes of operation, according to some embodiments of the invention.
Figure 5D:
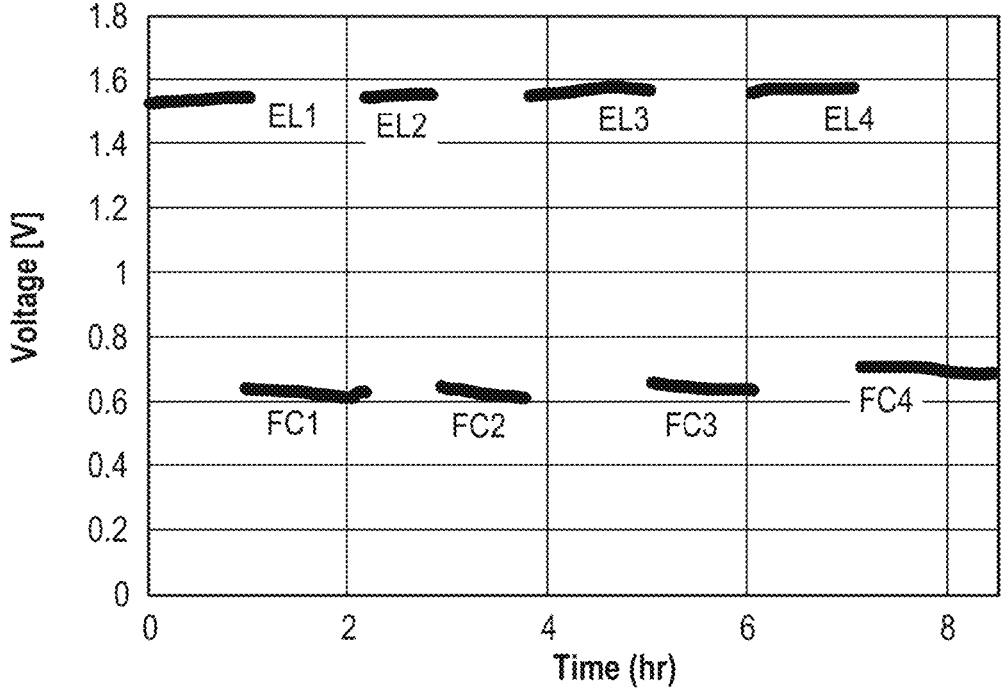

FIGS. 5C and 5D provide experimental results for four cycles between electrolyzer (EL1, EL2, EL3 and EL4) and fuel cell (FC1, FC2, FC3 and FC4) modes of operation, according to some embodiments of the invention. FIG. 5C provides data for catalyst blends without LDH, made with 0.776 mg/cm$^2$ Pt nanoparticles 0.024 mg/cm$^2$ ionomer, forming a catalyst loading of 0.8 mg/cm$^2$ and in FIG. 5D the catalyst blend included 10 wt % NiFeLDH (made as described for FIGS. 5A and 5B). The devices were operated with 0.05M KOH as electrolyte, as electrolyzer operated at 60° C. with an electrolyte throughput of 0.5 ml/min of 0.05M KOH, dry hydrogen and humidified oxygen. Fuel cell operation temperature was 67° C. Both figures indicate stable electrolyzer voltages (FIG. 5C—around 1.8V at 0.2 A/cm$^2$, FIG. 5D—at 1.55-1.6V at 0.2 A/cm$^2$) and fuel cell voltage (FIG. 5C—0.7-0.8V at 0.5 A/cm$^2$, FIG. 5D—0.6-

0.75V at 0.5 A/cm$^2$)—confirming the ability to cycle device 115 without degradation of the catalysts (with platinum nanoparticles, and with or without LDH).

Figure 6A:
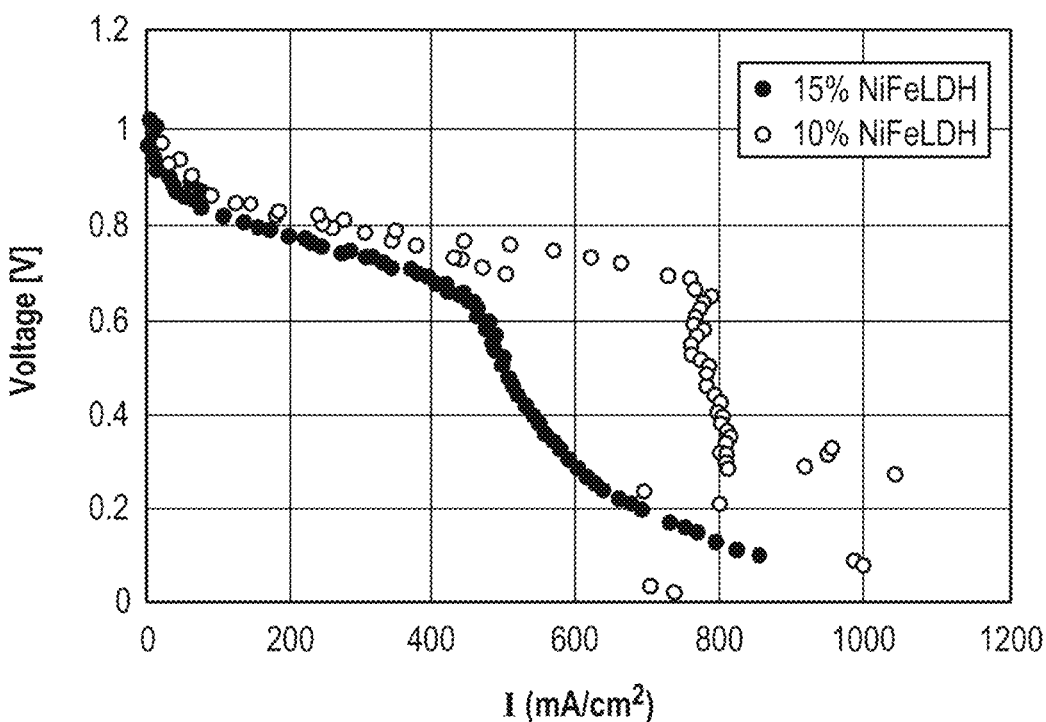
FIGS. 6A and 6B provide experimental results concerning the operation of devices with oxygen electrodes made with different catalyst blend compositions, according to some embodiments of the invention.
Figure 6B:
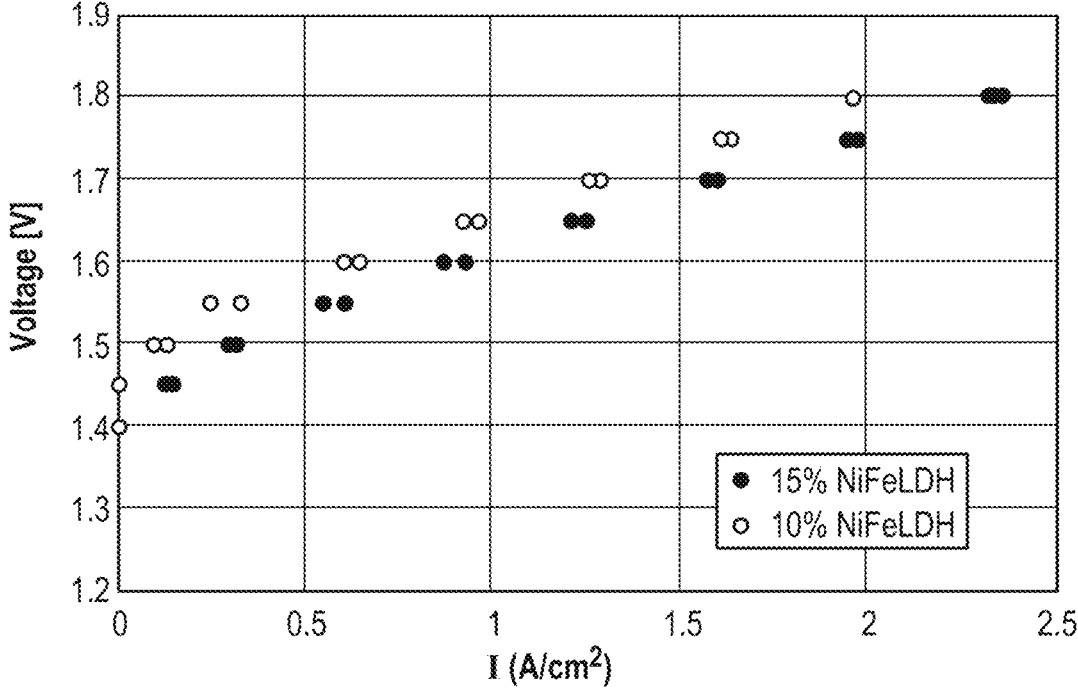

FIGS. 6A and 6B provide experimental results concerning the operation of devices 115 with oxygen electrodes 110 made with different catalyst blend compositions, according to some embodiments of the invention. The results compare catalyst blend 114 having catalyst loading of 1.23 mg/cm$^2$ of platinum nanoparticles and 0.225 mg/cm$^2$ of NiFeLDH and 0.045 mg/cm$^2$ ionomer (indicated as 15% NiFeLDH) with catalyst blend 114 having catalyst loading of 1.305 mg/cm$^2$ of platinum nanoparticles and 0.15 mg/cm$^2$ of NiFeLDH and 0.045 mg/cm$^2$ ionomer (indicated as 10% NiFeLDH). FIG. 6A indicates that the mass transport was better for the 10% NiFeLDH blend than with the 15% NiFeLDH blend, and FIG. 6B indicates that the IV curve of the electrolyzer mode of operation provides better results for the 10% NiFeLDH blend compared with the 15% NiFeLDH blend. It is also noted that including LDH as part of catalyst blend 114 reduces the operation voltage in electrolyzer mode from about 1.9-2V (without LDH) to around 1.5V at 0.2 A/cm$^2$ current density (with LDH, as indicated in FIG. 6B). As electrolyzer, device 115 was operated at 60° C. with an electrolyte throughput of 0.5 ml/min of 0.05M KOH.

Figures 7A, 7B, 7C:
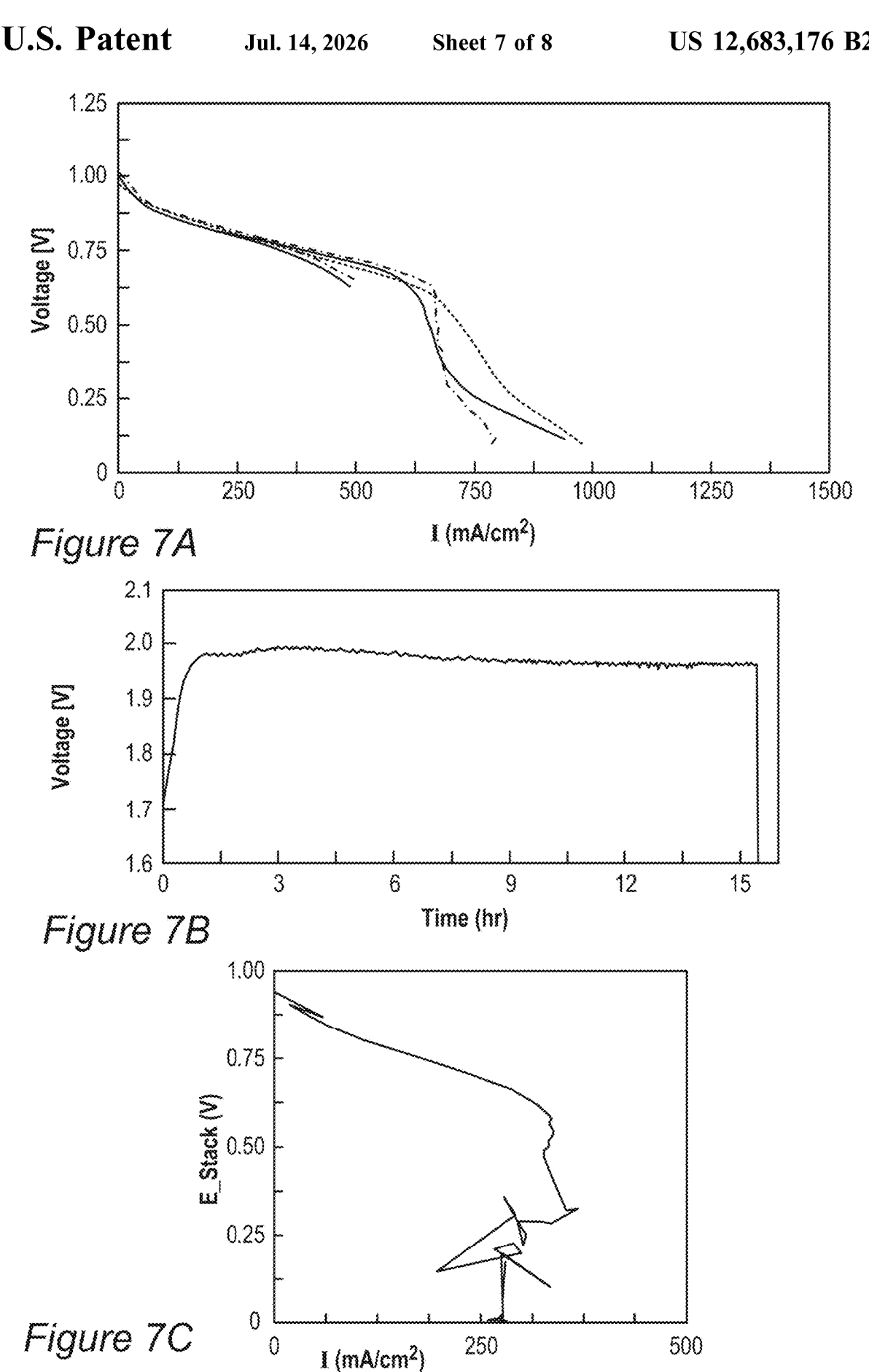
FIGS. 7A and 7B provide comparative experimental results concerning the operation of devices with oxygen electrodes made without LDH in the catalyst blend, according to some embodiments of the invention.
FIG. 7C illustrates an oxygen electrode which showed low performance and instability of the voltage over time.

FIGS. 7A and 7B provide comparative experimental results concerning the operation of devices 115 with oxygen electrodes 110 made without LDH in the catalyst blend, according to some embodiments of the invention. FIG. 7A provides IV curves for three runs of the cell with Pt catalyst loading of 3 mg/cm$^2$, indicating a limitation of the current to 750-850 mA/cm$^2$ around 0.6V, possibly suggesting modifications of Pt catalyst loading, membrane thickness and/or electrolyte throughputs. FIG. 7B illustrates result for lower Pt catalyst loading (0.8 mg/cm$^2$), resulting in high voltages (1.9-2 V) and low current densities (0.2 A/cm$^2$) in electrolyzer mode, which may result in low cell efficiency and higher voltage compared with oxygen electrodes with LDH that were tested, e.g., in FIGS. 6A and 6B. As electrolyzer, device 115 was operated at 60° C. with an electrolyte throughput of 0.5 ml/min of 0.05M KOH, and at a current density of 0.2 A/cm$^2$. FIG. 7C illustrates an oxygen electrode made with a catalyst layer of 1 mg/cm$^2$ of Pt and 1 mg/cm$^2$ of NiFeLDH and 0.06 mg/cm$^2$ of ionomer, which showed low performance and instability of the voltage over time at any reasonable current density.

Figure 8:
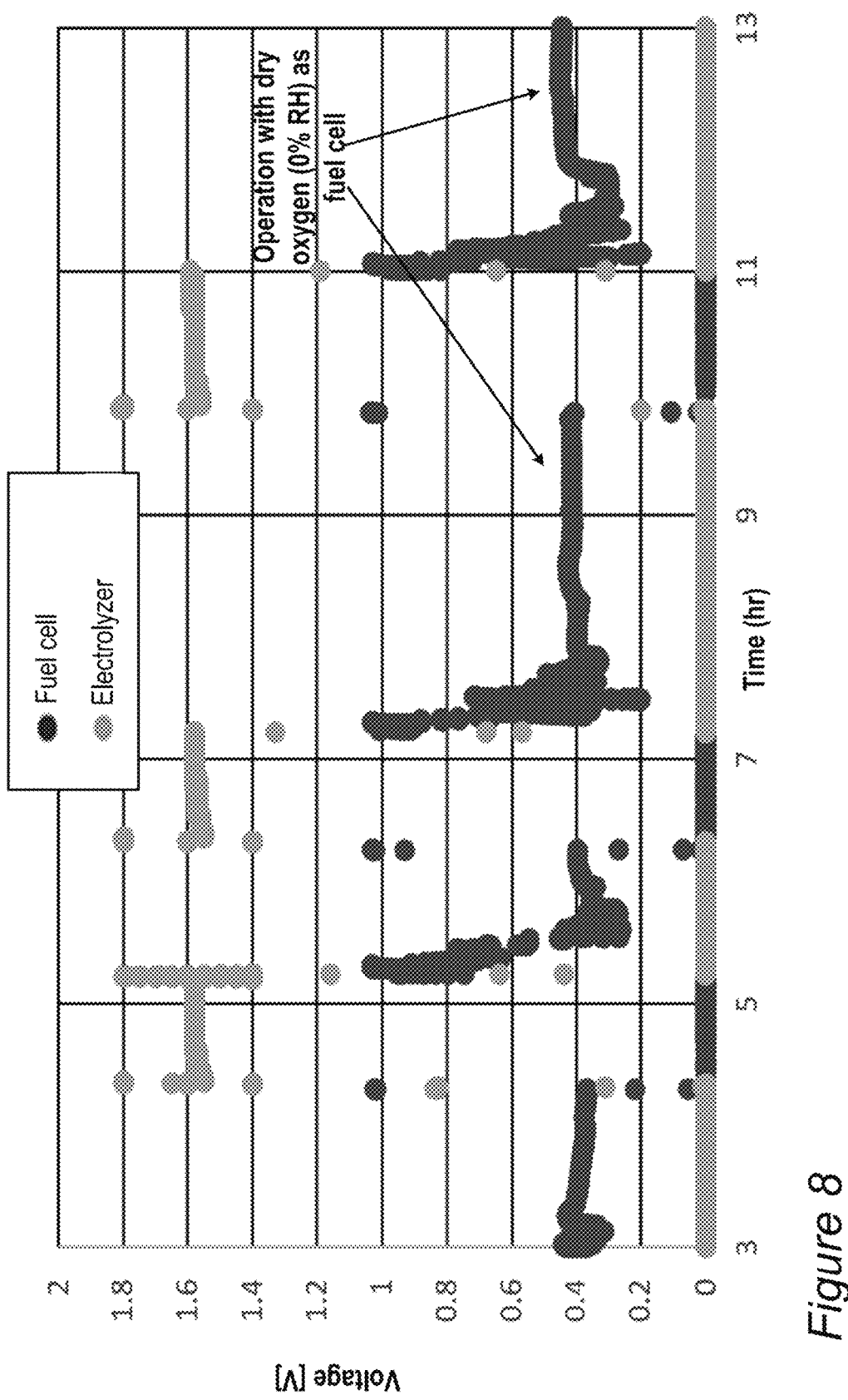
FIG. 8 provides an experimental example for operating the reversible device with oxygen electrodes using dry oxygen for the fuel cell operation, according to some embodiments of the invention.

FIG. 8 provides an experimental example for operating reversible device 115 with oxygen electrodes 110 using dry oxygen for the fuel cell operation, according to some embodiments of the invention. The initial test indicates that fuel cell operation under 0% relative humidity (RH) as well as cycling of the electrode (changing operation mode from fuel cell to electrolyzer and back) were possible with disclosed oxygen electrodes 110. Disclosed reversible device 115 in the example was prepared with oxygen electrodes 110 including PTL 113 with a catalyst blend of platinum nanoparticles and NiFeLDH, and PTFE as binder. As fuel cell, device 115 operated at 70° C. at a current of 0.5 A/cm$^2$ with dry O$_2$ and dry H$_2$; as electrolyzer, device 115 operated at 60° C. at a voltage of 1.6V and current of 0.2 A/cm$^2$, at an electrolyte throughput of 0.5 ml/min of 0.05M KOH.

Elements from FIGS. 1A-1D and 2 and embodiments described in FIGS. 3-8 may be combined in any operable combination, and the illustration of certain elements in certain figures and not in others merely serves an explanatory purpose and is non-limiting. It is noted that disclosed values may be modified by ±10% of the value.

In the above description, an embodiment is an example or implementation of the invention. The various appearances of "one embodiment", "an embodiment", "certain embodiments" or "some embodiments" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention may also be implemented in a single embodiment. Certain embodiments of the invention may include features from different embodiments disclosed above, and certain embodiments may incorporate elements from other embodiments disclosed above. The disclosure of elements of the invention in the context of a specific embodiment is not to be taken as limiting their use in the specific embodiment alone. Furthermore, it is to be understood that the invention can be carried out or practiced in various ways and that the invention can be implemented in certain embodiments other than the ones outlined in the description above.

The invention is not limited to those diagrams or to the corresponding descriptions. For example, flow need not move through each illustrated box or state, or in exactly the same order as illustrated and described. Meanings of technical and scientific terms used herein are to be commonly understood as by one of ordinary skill in the art to which the invention belongs, unless otherwise defined. While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

What is claimed is:

1. A dual, reversible, alkaline or anion exchange membrane (AEM) electrochemical device that is operable both as a fuel cell and as an electrolyzer, the device comprising:

an oxygen electrode comprising:

a substrate layer that is devoid of elemental carbon, and a catalyst layer deposited on the substrate layer, the catalyst layer comprising a blend of an oxygen reduction reaction (ORR) catalyst comprising at least one platinum group metal (PGM) and an oxygen evolution reaction (OER) catalyst comprising nickel iron layered double hydroxide (NiFeLDH) particles, wherein the catalyst layer is devoid of elemental carbon;

wherein the oxygen electrode is operable in a strongly alkaline environment as an anode to evolve oxygen in the OER when the alkaline or AEM device is operated as an electrolyzer, and as a cathode to reduce oxygen gas in the ORR when the alkaline or AEM device is operated as a fuel cell, over repeated cycles of operation, an electrode supporting a hydrogen oxidation reaction (HOR) when the alkaline or AEM device is operated as the fuel cell, and supporting a hydrogen evolution reaction (HER) when the alkaline or AEM device is operated as the electrolyzer, and a strongly alkaline electrolyte contacting the electrodes.

2. The device of claim 1, wherein the substrate layer comprises a porous transport layer (PTL).

3. The device of claim 1, wherein the substrate layer comprises a membrane, onto which the catalyst layer is deposited, and the oxygen electrode is part of a catalyst coated membrane (CCM).

4. The device of claim 3, wherein the CCM is coated on one side by the blend of ORR catalyst and OER catalyst, and on another side by a catalyst blend supporting a hydrogen oxidation reaction (HOR) when the device is operated as the fuel cell, and hydrogen evolution reaction (HER) when the device is operated as the electrolyzer.

5. The dual device of claim 4, configured to operate with dry oxygen during fuel cell operation of the device.

6. The device of claim 1, wherein the blend further comprises at least one binder comprising at least one ionomer.

7. The device of claim 1, further configured to operate with dry oxygen during fuel cell operation of the device.

8. A method of preparing a reversible, alkaline or anion exchange membrane (AEM) electrochemical device that is operable both as a fuel cell with the oxygen electrode supporting an oxygen reduction reaction (ORR) as a cathode of the fuel cell, and as an electrolyzer with the oxygen electrode supporting an oxygen evolution reaction (OER) as an anode of the electrolyzer, the method comprising:

preparing an oxygen electrode by:
blending an ORR catalyst comprising at least one platinum group metal (PGM) and an OER catalyst comprising nickel iron layered double hydroxide (NiFeLDH) particles, the blend being devoid of elemental carbon, and
depositing the blend on a substrate layer that is devoid of elemental carbon to form the oxygen electrode,
wherein said oxygen electrode is operable in an alkaline environment having a pH of 12 or more to evolve oxygen in an OER reduce oxygen gas in an ORR after repeated cycles of operation as a fuel cell and an electrolyzer; and
constructing the device with the oxygen electrode and an electrode supporting a hydrogen oxidation reaction (HOR) when the device is operated as the fuel cell, and supporting the hydrogen evolution reaction (HER) when the device is operated as the electrolyzer, and a strongly alkaline electrolyte contacting the electrodes.

9. The method of claim 8, wherein the substrate layer comprises a porous transport layer (PTL).

10. The method of claim 8, wherein the substrate layer comprises a membrane, and the oxygen electrode is part of a catalyst coated membrane (CCM).

11. The method of claim 10, further comprising coating the CCM on one side by the blend of ORR catalyst and OER catalyst, and on another side by a catalyst blend supporting a hydrogen oxidation reaction (HOR) when the device is operated as the fuel cell, and hydrogen evolution reaction (HER) when the device is operated as the electrolyzer.

12. The method of claim 8, wherein the blend further comprises at least one binder comprising one or more: ionomer, PTFE, and polymer resistant in alkaline environment.

13. The method of claim 8, further comprising configuring the oxygen electrode to operate with dry oxygen during fuel cell operation of the device.

14. The method of claim 8, further comprising selecting the OER catalyst to not degrade during fuel cell operation of the device, and the ORR catalyst to not degrade during electrolyzer operation of the device.

15. The device of claim 1, wherein said oxygen electrode evolves oxygen in the OER at a voltage below 2.0 V at a current density above 0.2 A/cm$^2$ and reduces oxygen gas in the ORR at a voltage greater than 0.4 V at a current density above 0.2 A/cm$^2$ after repeated cycles of operation as a fuel cell and an electrolyzer.

16. An alkaline or anion exchange membrane (AEM) electrolyzer comprising:
an oxygen electrode comprising:
a substrate layer that is devoid of elemental carbon, and
a catalyst layer deposited on the substrate layer, the catalyst layer comprising a an oxygen evolution reaction (OER) catalyst comprising nickel iron layered double hydroxide (NiFeLDH) particles, wherein the catalyst layer is devoid of elemental carbon;
wherein the oxygen electrode is operable in an alkaline environment having a pH of 12 or more as an anode to evolve oxygen in the OER over repeated cycles of operation, and
an electrode supporting a hydrogen evolution reaction (HER),
wherein the electrodes contact a strongly alkaline electrolyte.

17. The device of claim 1, wherein the blend further comprises at least one binder and the oxygen electrode is hot-pressed for a period of up to ten minutes at around the glass temperature of the binder to enhance its stability, homogeneity and increase its operational durability.

18. The electrolyzer of claim 16, wherein the substrate layer comprises a porous transport layer (PTL).

19. The electrolyzer of claim 16, wherein the substrate layer comprises a membrane, onto which the catalyst layer is deposited, and the oxygen electrode is part of a catalyst coated membrane (CCM).

20. The electrolyzer of claim 16, wherein the catalyst layer further comprises at least one binder comprising at least one ionomer.

21. The electrolyzer of claim 16, wherein the catalyst layer further comprises at least one binder and the oxygen electrode is hot-pressed for a period of up to ten minutes at around the glass temperature of the binder to enhance its stability, homogeneity and increase its operational durability.

* * * * *